US010075206B1

(12) United States Patent
Erentok et al.

(10) Patent No.: US 10,075,206 B1
(45) Date of Patent: Sep. 11, 2018

(54) CUSTOMIZABLE WEARABLE ELECTRONIC DEVICES AND METHODS OF ASSEMBLING THE SAME (71) Applicant: Intel Corporation, Santa Clara, CA (US)

(72) Inventors: Aycan Erentok, Sunnyvale, CA (US); John Groff, Santa Clara, CA (US); Huan-Sheng Hwang, Santa Clara, CA (US); Paul Beaucourt, Santa Clara, CA (US); Thomas H. Liu, Santa Clara, CA (US); Jose R. Camacho Perez, Santa Clara, CA (US); Brian Girvin, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/457,595

(22) Filed: Mar. 13, 2017

(51) Int. Cl.
H04B 1/3888 (2015.01)
H04M 1/04 (2006.01)

(52) U.S. Cl.
CPC ............ *H04B 1/3888* (2013.01); *H04M 1/04* (2013.01)

(58) Field of Classification Search
CPC ..................... H04B 1/3888; H04B 5/0081
See application file for complete search history.

(56) References Cited

U.S. PATENT DOCUMENTS 5,699,319 A   12/1997  Skrivervik
9,705,549 B1   7/2017  Erentok et al.
2005/0219955 A1*  10/2005  Xu .................. G04G 21/04
368/88

(Continued)

FOREIGN PATENT DOCUMENTS

CN   203932307 U   11/2014
CN   204009393 U   12/2014

(Continued)

OTHER PUBLICATIONS

United States Patent and Trademark Office, "Notice of Allowance," issued in connection with U.S. Appl. No. 15/193,356, dated Dec. 14, 2016, 8 pages.

*Primary Examiner* — Tuan H Nguyen
(74) *Attorney, Agent, or Firm* — Hanley, Flight & Zimmerman, LLC (57) ABSTRACT

Example customizable example customizable wearable electronic devices, and methods of assembling the same are disclosed. An example customizable wearable electronic device includes a housing bottom member, a housing top member including a radio frequency (RF) attenuating portion that includes a material that attenuates RF energy and an RF conducting portion that includes an electrically-conductive material, the housing top member separated from the housing bottom member by an electrical isolation gap member, an electrically-conductive contact to couple the RF conducting portion of the top housing member to a communication module in the customizable wearable electronic device, and a customization part selected from a plurality of different customization parts having respective different configurations, the selected customization part electrically coupled to the RF conducting portion of the housing top member when the selected customization part is assembled to the housing top member.

21 Claims, 8 Drawing Sheets (56) References Cited

U.S. PATENT DOCUMENTS

| | | |
|---|---|---|
| 2007/0109208 A1 | 5/2007 | Turner |
| 2009/0034372 A1 | 2/2009 | Fujisawa |
| 2015/0297145 A1* | 10/2015 | Luna .................... A61B 5/7278 600/301 |
| 2016/0020506 A1 | 1/2016 | Mahanfar et al. |
| 2016/0210616 A1 | 7/2016 | Lee et al. |
| 2016/0234949 A1 | 8/2016 | Seo et al. |
| 2016/0252979 A1 | 9/2016 | Yun et al. |
| 2016/0254587 A1 | 9/2016 | Jung et al. |

FOREIGN PATENT DOCUMENTS

| | | |
|---|---|---|
| CN | 104638361 | 5/2015 |
| CN | 204481128 U | 7/2015 |
| WO | 2015117647 A1 | 8/2015 |

* cited by examiner

CUSTOMIZABLE WEARABLE ELECTRONIC DEVICES AND METHODS OF ASSEMBLING THE SAME

TECHNICAL FIELD

The present disclosure relates generally to wearable electronic devices and, more particularly, to customizable wearable electronic devices, and methods of assembling the same.

BACKGROUND

Interest in wearable electronic devices is increasing. Example wearable electronic devices include smart watches, fitness trackers, head-mounted displays, medical devices, etc. Some wearable electronic devices wirelessly communicate with nearby devices using communications protocols such as Bluetooth®, Bluetooth® Low Energy, Near Field Communications, etc. In addition, some wearable electronic devices communicate at greater distances via wireless local area networks (e.g., using the IEEE 802.11x family of standards), cellular communication (e.g., 3G, 4G, 5G, LTE, CDMA, GSM, etc.), reception of satellite content (e.g., global positioning data via GPS/GLONASS/Galileo), etc.

DETAILED DESCRIPTION

To provide differentiation in the increasingly crowded wearable electronic devices marketplace, industrial designers are gravitating toward the use of exotic and/or precious materials (e.g., titanium, high-grade stainless alloys, gold, silver, platinum, carbon fiber, plastic, aluminum, etc.) for the body or housing of wearable electronic device. Such materials enable forms and/or exterior finishes that are distinct and aesthetically pleasing. However, such materials can interfere with the operation of an antenna of a wearable electronic device. Moreover, when a wearable electronic device is customized during assembly and/or manufacture with different external parts or components that are not integral or unitary with the housing of the device, the shape and/or materials of those external parts may interfere with the operation of an antenna of the wearable electronic device. For example, a metal watch bezel could create ground loops that interfere with the antenna and, thereby, adversely affect the performance of the wearable electronic device.

Example customizable wearable electronic devices, and methods of assembling the same are disclosed herein that overcome at least these problems. In examples disclosed herein, customizable(-ed) parts (e.g., structures, assemblies, components, elements, etc.) are shown and described that may be assembled to customizable wearable electronic devices to customize the color, look, style, aesthetics, shape, function, etc. of the wearable electronic devices. The examples described herein enable customizable wearable electronic devices that can be customized at assembly (e.g., manufacture, construction, build, etc.), post-assembly (e.g., my retailer, reseller, consumer, business, etc.), etc. and that include antennae that support wireless communication according to, for example, Bluetooth®, Bluetooth® Low Energy (BLE), the Institute of Electronics and Electrical (IEEE) 802.11x family of standards (aka Wi-Fi®), the Global Navigation Satellite System (GNSS), near-field communication (NFC), cellular communication (e.g., 3G, 4G, 5G, Long-Term Evolution (LTE), Code-Division Multiple Access (CDMA), Global System for Mobile communication (GSM), etc.), etc.

Disclosed examples have antennae can operate in the relatively small form factor of a customizable wearable electronic device in the presence of the display touch module (DTM) present in most wearable electronic devices. In some examples, top and bottom portions of the wearable electronic device are spaced apart by a electrical-isolation gap member that enables an antenna to radiate externally, thereby improving antenna performance. In some examples, the customized(-able) part(s) of a customizable wearable electronic device become electrically coupled to the top portion during assembly, allowing the customized part(s) to form part of the antenna.

Wearable electronic devices are any electronic device capable of being attached to, affixed to, carried by, positioned by, placed in, implanted in, or otherwise worn by a user. Example wearable electronic devices may include, but are not limited to, eyewear (e.g., Google Glass™), head mounted displays, pendants, bracelets, braces, broaches, rings, watches, fitness trackers, clothing, medical devices, and similar devices. While the examples disclosed herein refer to a customizable wearable electronic device in the form of a timepiece (e.g., a wristwatch), the teachings of this disclosure are applicable any other customizable wearable electronic device. Moreover, the teachings of this disclosure may be applied to non-wearable customizable electronic devices having customized(-able) parts that may interfere with an antenna operation of the device.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

For ease of explanation, use of terms such as up, down, top, bottom, side, end, front, back, etc. herein is with reference to a currently considered or illustrated orientation of an object, part, component, element, etc. If the object, part, component, element, etc. is considered with respect to another orientation, it should be understood that such terms must be correspondingly modified. Moreover, the accompanying drawings may not be drawn to scale for purposes of clarity, and ease of understanding.

Figure 1:
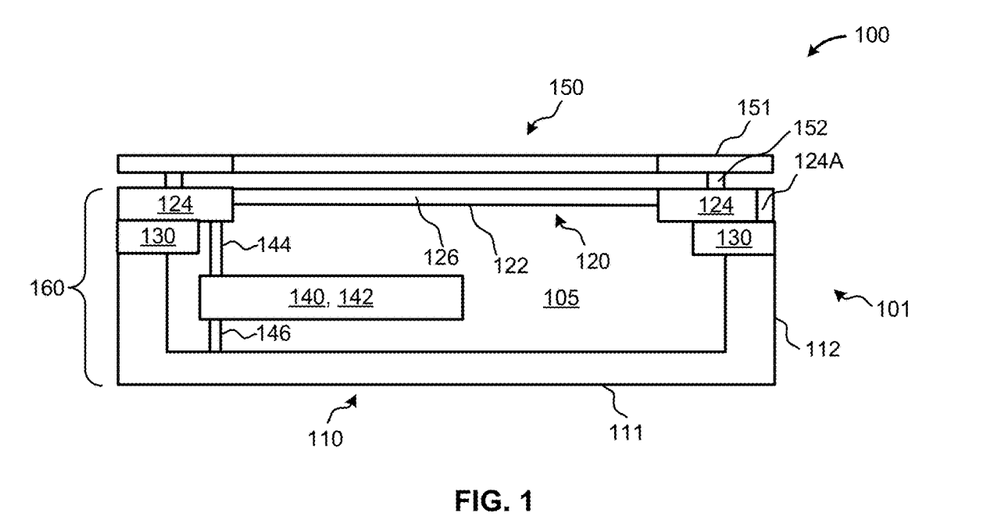
FIG. 1 is a cross-sectional view of an example customizable wearable electronic device in accordance with this disclosure.

FIG. 1 depicts an example customizable wearable electronic device 100 in accordance with this disclosure. The example customizable wearable electronic device 100 includes a multi-piece housing 101 including at least an example housing bottom member 110 and an example housing top member 120 operably coupled to the bottom member 110. In assembly, the example bottom member 110 and the example top member 120 are spaced apart by, or separated by an example electrical-isolation gap member 130 (e.g., a plastic ring, a coating, or any other materials and/or members that electrically isolate the bottom member 110 from the top member 120) that electrically isolates the bottom member 110 from the top member 120. In some examples, the top member 120 includes an example radio frequency (RF) attenuating portion 122 formed of one or more materials capable of attenuating an RF signal, and an example RF conducting portion 124 formed of one or more materials that are electrically-conductive and propagate incident RF signals. One or more example communication modules 140 are disposed in the housing 101 (e.g., between the housing top member 120 and the housing bottom member 110) on, for example, a printed circuit board (PCB) 142. One or more example electrically-conductive contacts 144 electrically couple the one or more communication modules 140 to the RF conducting portion 124 of the top member 120. The one or more communication modules 140 communicate with external devices via the electrically-conductive contacts 144 and the RF conducting portion 124.

The example bottom member 110 forms a portion of the housing 101 of the example customizable wearable electronic device 100. For example, the bottom member 110 may include, but is not limited to, a watch case containing at least some of the mechanical and/or electromechanical components used to implement a timepiece. In some examples, the bottom member 110 includes an example floor 111 partially or completely surrounded or bordered by a wall 112 to form a partially enclosed void space 105 within the bottom member 110. In some examples, the floor 111 and the wall 112 are fabricated as a unitary structure.

The example bottom member 110 may have any physical size, shape, configuration and/or dimensions capable of being worn by a user. For example, the bottom member 110 may include a physical configuration that is circular, oval, rectangular, square, triangular, trapezoidal, and/or any combination thereof. Non-geometric shapes may also be used. The bottom member 110 may be fabricated as a single-piece or may include a multi-piece assembly that is affixed, bonded, or otherwise physically coupled or attached to form a unitary assembly to which individual components may be permanently or detachably affixed. Although the example floor 111 is depicted in FIG. 1 as a flat surface forming the bottom of the electronic device 100, the floor 111 may have any shape or physical configuration, such as concave, convex, angled, or any combination thereof. In some examples, the floor 111 includes openings, components, devices, conductors, sensors, etc. embedded therein and/or therethrough. In such examples, the PCB 142 and/or the one or more communication modules 140 may be electrically coupled to the floor 111, or elements thereof, via example electrically-conductive contacts 146. In some examples, the electrically-conductive contacts 146 are used to, for example, perform antenna tuning, provide electro-static discharge (ESD) protection, etc.

The example bottom member 110 may be fabricated, for example, using one or more conductive materials including one or more conductive metallic materials and/or one or more conductive non-metallic materials. Example conductive metals or metal alloys include, but are not limited to, titanium, gold, silver, platinum, steel, stainless steel, magnesium, aluminum, and/or alloys containing one or more of the aforementioned. Example conductive non-metals include, but are not limited to, graphene, conductive polymers, polymers containing one or more conductive materials (e.g., silver nanowires in a polymer matrix), and/or compounds containing one or more of the aforementioned.

Figure 5:
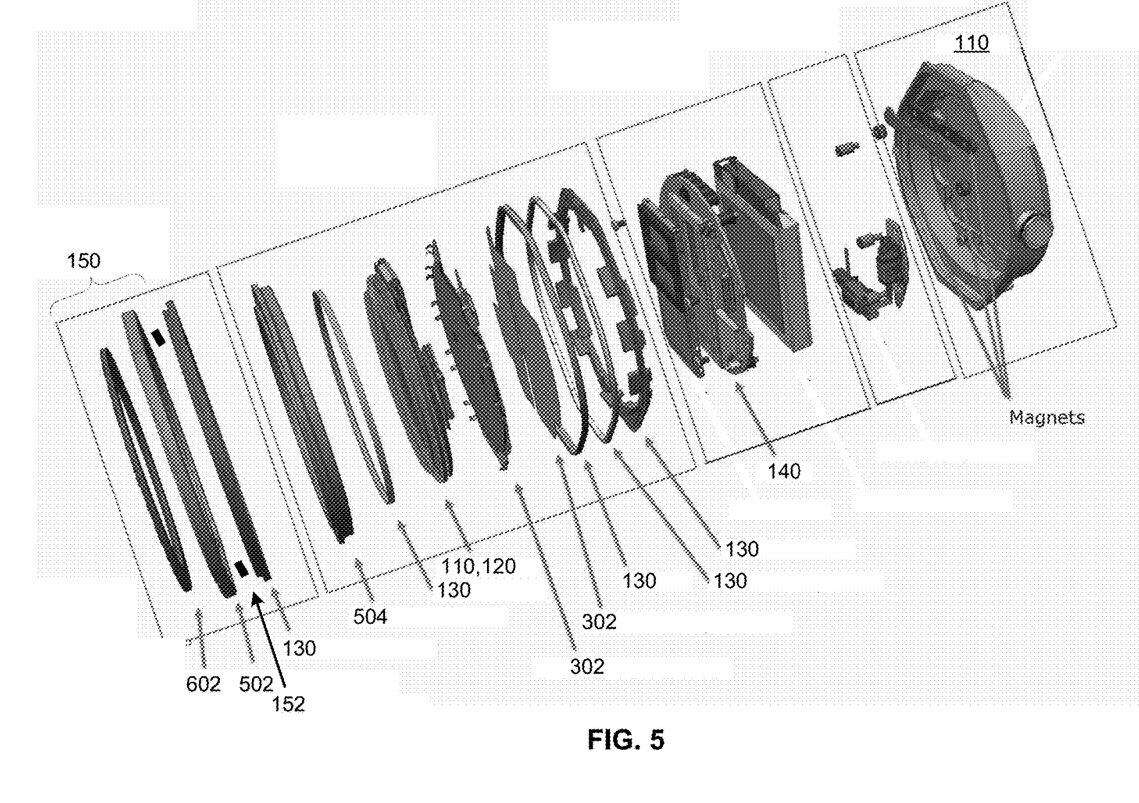
FIG. 5 is an exploded view of still another example customizable wearable electronic device in accordance with this disclosure.

The separation distance (i.e., the thickness of the electrical-isolation gap member(s) 130) between the bottom member 110 and the RF conducting portion 124 of the top member 120 may be selected, in some implementations, based on the RF signals produced by the one or more communication modules 140. The electrical-isolation gap member(s) 130 may provide an electrical isolation gap having any dimension including, but not limited to, about 0.1 millimeters (mm) or less; about 0.2 mm4 or less; about 0.3 mm or less; about 0.5 mm or less; about 0.7 mm or less; about 0.9 mm or less; about 1.0 mm or less; about 1.3 mm or less; or about 1.5 mm or less; etc. In some examples, the electrical-isolation gap member 130 between the bottom member 110 and the RF conducting portion 124 of the top member 120 is selected or otherwise determined, in whole or in part, based on a desired resonant frequency for the RF signals produced or otherwise generated by the one or more communication modules 140. The example electrical-isolation gap member 130 may be formed of, for example, a plastic material, a rubber material, a glue, any other non-conductive material(s), or combinations thereof. As shown in FIG. 5, the example electrical-isolation gap member 130 may include multiple parts.

The one or more example communication modules 140 include one or more transmitters, receivers, transceivers, signal generators, processors, circuits, devices, components, etc. and/or combinations of the same capable of generating, transmitting and/or receiving signals at one or more frequencies, in one or more frequency ranges, and/or in one or more frequency bands. In some examples, the one or more communication modules 140 include, but are not limited to, one or more Wi-Fi® transceivers, one or more Bluetooth® transceivers, one or more BLE transceivers, one or more NFC transceivers, one or more satellite receivers, one or more cellular communication (e.g., 3G, 4G, 5G, LTE, CDMA, GSM) transceivers, and/or combinations thereof. In some examples, the one or more generators, transmitters, receivers, transceivers, etc. are implemented with discrete components, however, they may be included in part or in whole in another component or device, such as a system on a chip (SoC), or similar processor-based device. In some examples, the one or more communication modules 140 include or may be coupled to one or more frequency diplexers to permit the generation and simultaneous transmission/reception of information and/or data over a plurality of different frequency ranges.

One or more example electrically-conductive contacts 144 electrically couple the one or more communication modules 140 with the RF conducting portion 124 of the top member 120. The one or more example electrically-conductive contacts 144 include any number and/or combination of devices, components, conductors, and/or systems to electrically couple the one or more communication modules 140 to the RF conducting portion 124 of the top member 120. Example electrically-conductive contacts 144 include, but are not limited to, one or more spring clips, coiled springs, flat springs, metal clips, compressible conductive materials (e.g., conductive foam), laser direct structuring (LDS) structures, molded interconnect devices, conductive printing with supporting plastics, and/or any other elastic electrically-conductive members capable of providing an elastic force against both the one or more communication modules 140, and the RF conducting portion 124 of the top member 120 to maintain the communication modules 140 and the top member 120 in a reliable, consistent, etc. electrically coupled state.

The example RF attenuating portion 122 of the top member 120 may include a DTM 126 having a number of transparent electrically conductive layers having a reduced electrical resistance. Such transparent electrically conductive layers may include transparent conductive materials such as indium tin oxide (ITO), transparent conductive polymers, transparent structures (e.g., metallic nanostructures, conductive graphene nanostructures) embedded in a polymer matrix, or any combination thereof. While not shown, the RF attenuating portion 122 of the top member 120 may include one or more glass layers (e.g., sapphire/aluminum oxide glass, Corning® Gorilla® glass) that contribute to the RF attenuating properties of the RF attenuating portion 122 of the top member 120. Further, the RF attenuating portion 122 of the top member 120 may include display devices, such as the anode and cathode found in organic light emitting diode (OLED) displays.

The example RF conducting portion 124 of the top member 120 includes one or more electrically-conductive segments (one of which is designated at reference numeral 124A) that provide one or more radiating surfaces (e.g., antennae) for the RF signals produced by the one or more communication modules 140. In some example, the segments 124A are electrically isolated from each other, and radiate respective ones of a plurality of RF signals produced by the one or more communication modules 140. The example RF conducting portion 124 of the example top member 120 may include one or more electrically-conductive materials capable of supporting the propagation of the RF signals produced by the one or more communication modules 140. All or a portion of the RF conducting portion 124 of the top member 120 may be exposed, providing functional and/or aesthetic features to the electronic device 100. In some examples, all or a portion of the RF conducting portion 124 of the top member 120 may be covered by one or more layers or coatings of a material transparent to RF signals. Such layers or coatings may include one or more aesthetic coatings and/or one or more functional coatings. In some examples, all or a portion of the RF conducting portion 124 of the top member 120 may include one or more electrically-conductive metals or metal alloys, one or more electrically-conductive non-metals, combinations of the same, etc. In some implementations, the composition of all or a portion of the RF conducting portion 124 of the top member 120 may be based on the frequency of the RF-signals produced or otherwise generated by the one or more communication modules 140.

In the example of FIG. 1, an example customization structure or assembly 150 is assembled to the top member 120 of a base customizable wearable electronic device 160 to customize the example customizable wearable electronic device 100. The example customization structure 150 includes one or more interchangeable parts (one of which is designated at reference numeral 151) that can be selected to, for example, customize the color, look, style, aesthetics, shape, add a feature, change a functionality, etc. of the customizable wearable electronic device 100. For example, an analog or digital watch can be assembled to include a bezel 602 (see FIG. 6) having one of a plurality of colors and/or materials, or any other conductive structure that partially or completely encircles the top or face of the watch. The interchangeable customization parts 151 may be fixedly assembled to the base customizable wearable electronic device 160 at initial manufacture, initial assembly, third party customization, time of sale, by an end user or consumer, etc. Additionally or alternatively, the interchangeable customization parts 151 may be removably assembled to the customizable wearable electronic device 100 such that the device 100 can be (re-)customized at a later date.

The example customization structure 150 is electrically coupled to the top member 120 via one or more intervening electrically conductive couplers, one of which is designated at reference numeral 152. In some examples, the intervening electrically conductive couplers 152 are compressible or elastic electrically conductive members, such as one or more spring clips, coiled springs, flat springs, metal clips, compressible conductive materials, conductive foam, and/or any other electrically-conductive members capable of providing an elastic or resilient force against both the customization structure 150 and the top member 120. That force maintains the customization structure 150 and the top member 120 in a reliable, resilient, consistent, etc. electrically coupled state. Accordingly, electrical conditions (e.g., ground loops, reflections, signal attenuation, signal distortion, etc.) that can interfere with antenna operation when the customization structure 150 and the top member 120 are poorly or insufficiently electrically coupled are avoided, mitigated, reduced, etc. Instead, the customization structure 150 beneficially becomes electrically an integral part of the antenna structure that includes the top member 120. Accordingly, customization of the customizable wearable electronic device 100 does not degrade the RF performance of the wearable electronic device 100, but can, in some circumstances enhance the RF performance of the wearable electronic device 100.

Figure 2:
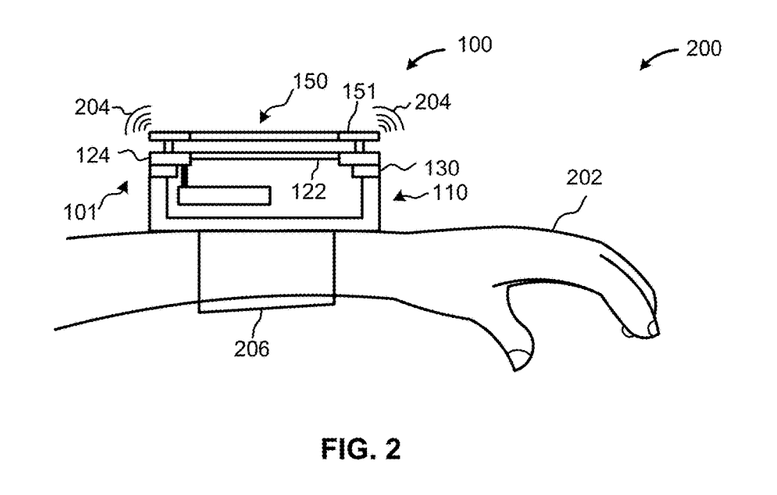
FIG. 2 is a cross-sectional view of an example customizable wearable electronic device positioned on an arm of a wearer in accordance with this disclosure.

FIG. 2 is a partial cross-sectional view of an example system 200 that includes the example customizable wearable electronic device 100 being worn on an arm 202. As depicted in FIG. 2, the example customization structure 150 and the RF conducting portion 124 of the top member 120 radiate an RF signal 204 produced or otherwise generated by the one or more communication modules 140 of the electronic device 100. As depicted in FIG. 2, one or more fasteners, pins, belts, buckles, bracelets, straps, etc. 206 may be operably coupled to the electronic device 100, to enable the electronic device 100 to be worn on the arm 202.

In the examples disclosed herein, and as shown in FIG. 2, the energy carried by the RF signal 204 is beneficially emitted by the electronic device 100 in directions that can reduce the detrimental effects of attenuation caused by components in the RF attenuating portion 122 of the top member 120, and attenuation caused by the arm 202. Such an arrangement can reduce any detrimental effect of the RF signals 204 on the user 202 by causing the RF signal 204 to radiate in an outward direction, away from the device user 202. Such an arrangement may also reduce the likelihood of interference with other electromechanical or electrical devices (e.g., pacemakers) used by the user 202 by directing the RF signals 204 emitted by the electronic device 100 in a direction away from the device user 202. By electrically coupling the customization structures 150 with the top member 120 so the customization structures 150 become part of an antenna of the customizable wearable electronic device 100, the example customizable wearable electronic devices disclosed preserve these and other benefits while allowing flexibility in the customizations that can be performed.

Figure 3:
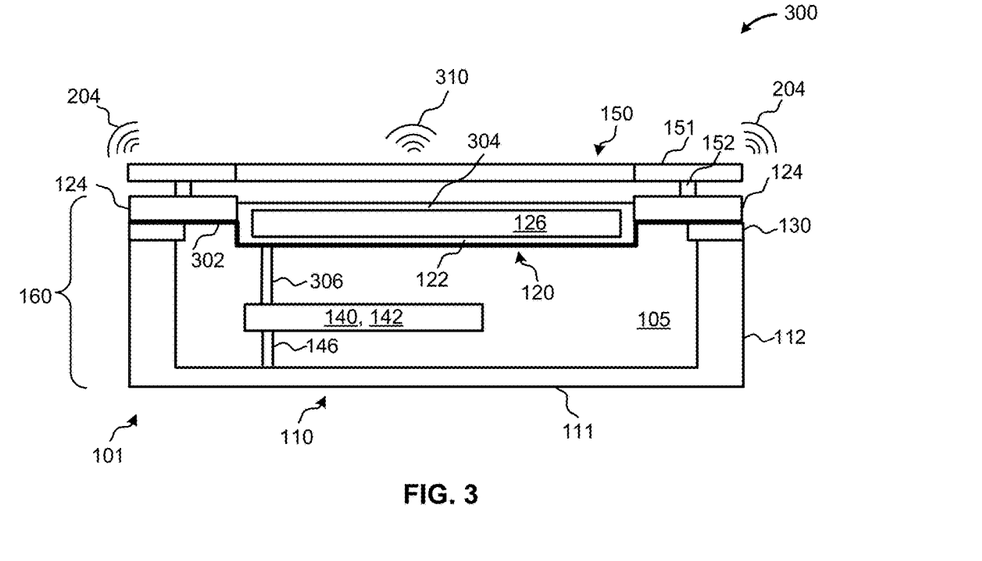
FIG. 3 is a cross-sectional view of another example customizable wearable electronic device in accordance with this disclosure.

FIG. 3 is a cross-section of another example customizable wearable electronic device 300 that includes an example electrically-conductive shield 302, and an example NFC antenna 304 disposed between the one or more communication modules 140 and the RF attenuating portion 122 of the top member 120. As depicted in FIG. 3, in some examples, the electrically-conductive shield 302 is electrically coupled to all or a portion of the RF conducting portion 124 of the top member 120. In some examples, the electrically-conductive shield 302 is electrically isolated from the RF attenuating portion 122 of the top member 120. In some examples, one or more electrically-conductive contacts 306 electrically couple the one or more communication modules 140 to the electrically-conductive shield 302, which, in turn, electrically couples to the RF conducting portion 124 of the top member 120. Thus, as depicted in FIG. 3, an example RF signal 310 from the NFC antenna 304 can pass around the RF attenuating portion 122 of the top member 120 via the electrically-conductive shield 302.

The example electrically-conductive shield 302 may include any number and/or combination of devices and/or systems capable of electrically shielding at least a portion of the space 105 from the RF attenuating portion 122 of the top member 120, while electrically coupling the one or more communication modules 140 to the RF conducting portion 124 of the top member 120. In some examples, the electrically-conductive shield 302 includes one or more electrically-conductive metals, electrically-conductive metal alloys, electrically-conductive non-metallic materials, electrically-conductive materials, combinations thereof, etc.

The example electrically-conductive shield 302 is electrically coupled to the example RF conducting portion 124 of the top member 120. In some implementations, the electrical coupling between the electrically-conductive shield 302 and the RF conducting portion 124 of the top member 120 includes one or more electrically-conductive bonding agents, such as an electrically-conductive adhesive, etc. In some examples, the conductive coupling between the electrically-conductive shield 302 and the RF conducting portion 124 of the top member 120 includes one or more fasteners, such as one or more electrically-conductive spring clips, screws, bolts, or similar detachably attachable or non-detachably attachable fasteners. In some examples, the electrical coupling between the electrically-conductive shield 302 and the RF conducting portion 124 of the top member 120 includes other mechanical attachment, such as welding, soldering, brazing, etc.

The example NFC antenna 304 may include any number and/or combination of devices and/or systems capable of radiating the RF electromagnetic energy 310 in the form of one or more RF signals at or about one or more NFC frequencies, such as around 13.56 megahertz (MHz). Since NFC is intended to operate at very short distances (e.g., 2 to 4 centimeters), the attenuation provided by the RF attenuating portion 122 of the top member 120 does not interfere with NFC communications, and the NFC antenna 304 may be disposed between the upper surface of the electrically-conductive shield 302 and the RF attenuating portion 122 of the top member 120. In some examples, the electrically-conductive shield 302 implements a Faraday cage for the RF attenuating portion 122 of the top member 120 to mitigate the losses and ferrite material that is part of the NFC antenna 304. The electrically-conductive shield 302 also implements part of a single and/or multi-band antenna that radiates together with the RF conducting portion 124.

The example electrically-conductive contacts 306 electrically couple the one or more communication modules 140 to the electrically-conductive shield 302. The electrically-conductive contacts 306 may include any number and/or combination of devices and/or systems capable of transmitting or otherwise communicating the RF signal 204 from the one or more communication modules 140 to the RF conducting portion 124 of the top member 120. In some examples, the one or more communication modules 140 generate a plurality of RF signals, each in a different frequency band. In such instances, one or more electrically-conductive contacts 306 may electrically couple respective ones of the one or more communication modules 140 to corresponding segments of the RF conducting portion 124 of the top member 120. The electrically-conductive contacts 306 may include one or more spring clips or similar elastic electrically-conductive members capable of providing an electrically-conductive pathway from the one or more communication modules 140 to all or a portion of the RF conducting portion 124 of the top member 120. In some implementations, the one or more electrically-conductive contacts 306 may also beneficially provide electrostatic discharge (ESD) protection for at least a portion of the electronic components included in the example customizable wearable electronic device 300. In some implementations, the one or more electrically-conductive contacts 306 may also beneficially provide an antenna tuning element for use with the communication module 140.

Figure 4:
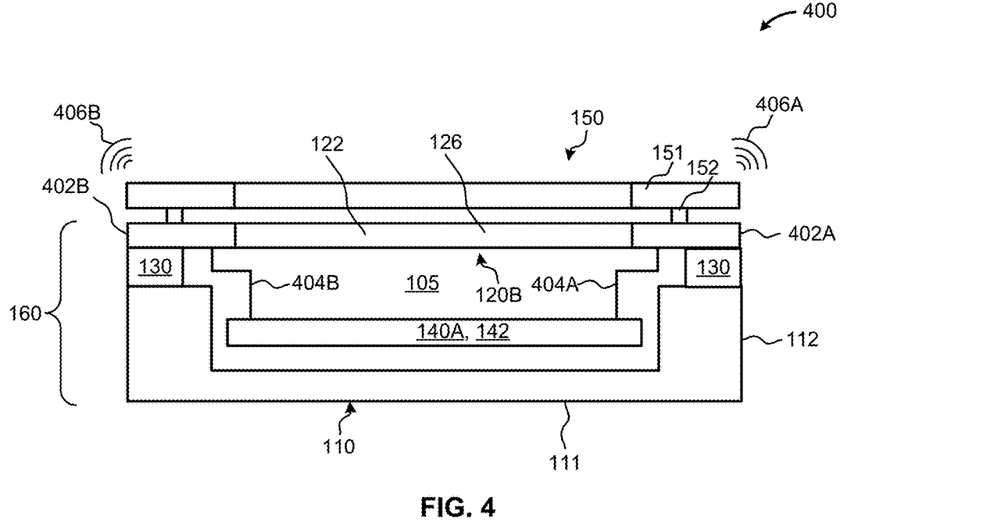
FIG. 4 is a cross-sectional view of a further example customizable wearable electronic device in accordance with this disclosure.

FIG. 4 is a cross-section of another example customizable wearable electronic device 400 that includes an example top member 120B having an example RF conducting portion 124B that includes a plurality of segments, two of which are designated at reference numerals 402A and 402B. A plurality of electrically-conductive contacts, two of which are designated at reference numerals 404A and 404B, electrically couple the one or more communication modules 140 to respective ones of the segments 402A and 402B. In some examples, the one or more communication modules 140 may generate or otherwise produce a plurality of RF signals, two of which are designated at reference numerals 406A and 406B. In some examples, the segments 402A and 402B receive a different RF signal 406A, 406B from respective ones of the one or more communication modules 140. In some examples, some or all of the segments 402A and 402B emit/receive more than one RF signal 406A, 406B. For example, some or all of the segments 402A, 402B may emit/receive a first RF signal 406A in a first frequency band, and a second RF signal 406B in a second frequency band. Such multi-band signals may be generated, for example, using one or more diplexers to combine the different frequency RF signals 406A and 406B to produce a single multi-band signal.

Figure 6:
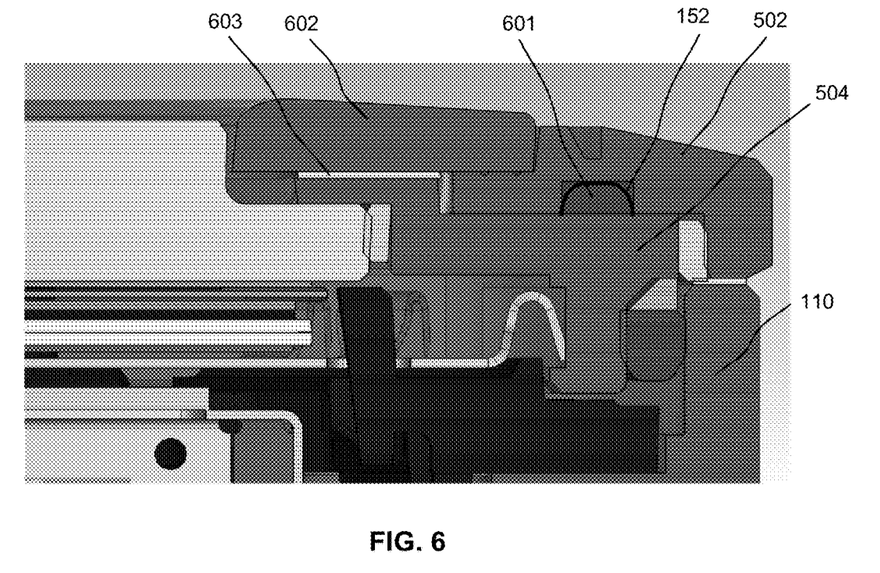
FIG. 6 is a partial cross-sectional view of the example customizable wearable electronic device of FIG. 5, after assembly.
Figure 7:
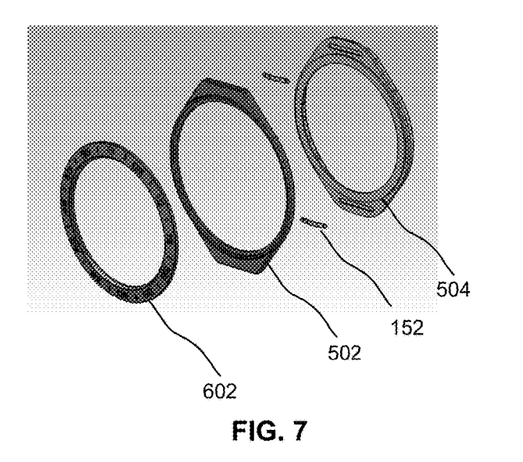
FIG. 7 is an exploded view of an example customization bezel assembly for the example customizable wearable electronic device of FIG. 5 in accordance with this disclosure.

FIG. 5 is an exploded perspective view of an example manner of implementing the example customizable wearable electronic device 200 of FIG. 2. FIG. 6 is a partial side cross-sectional view of the example customizable wearable electronic device of FIG. 5, after assembly. FIG. 7 is an exploded perspective view of the example customization structure 150 of FIG. 5 from a different perspective. In the examples of FIGS. 5-7, the customization structure 150 includes a cosmetic base ring 502, which is physically coupled to a support ring 504 of a base customizable wearable electronic device 160, with intervening electrically-conductive spring clips 152 positioned in spaces or openings 601 (see FIG. 6) formed between the cosmetic base ring 504 and the support ring 502. The cosmetic base 502 may be physically coupled to the support ring 504 using, for example, screws, snap member, glue, adhesive, press fit, etc. As the cosmetic base 502 is physically coupled to the support ring 504, the spring clips 152 become compressed between the cosmetic base 502 and the support ring 504. The compression exerted on the spring clips 152 ensure that they remain in reliable and consistent electrical contact with the cosmetic base 502 and the support ring 504. According, the cosmetic base 502 and the support ring 504 are brought into reliable and consistent electrical contact by the spring clips 152. Thus, the cosmetic base 502 beneficially becomes electrically an integral part of the antenna structure that includes the support ring 504 of the base customizable wearable electronic device 160. Accordingly, customization of the customizable wearable electronic device 100 does not degrade the RF performance of the wearable electronic device 100, but can, in some circumstances enhance the RF performance of the wearable electronic device 100.

An example cosmetic ring 602 (see FIG. 6) is placed within the cosmetic base ring 504 using, for example, an adhesive 603. The cosmetic ring 602 can be attached to the example support ring 504 using dielectric and/or electrically conductive materials depending on, for example, antenna tuning. As shown in FIGS. 5-7, the elements discussed above in connection with FIGS. 1-4 may be implemented using multiple parts.

Figure 8:
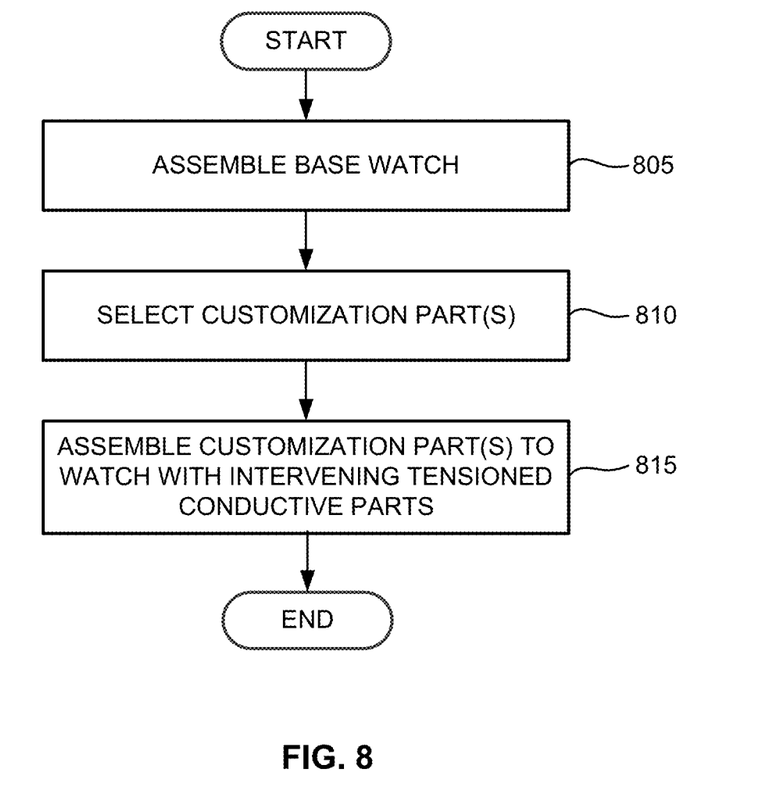
FIG. 8 is a flow diagram representing example processes that may be implemented as machine-readable instructions that may be executed to assemble a customizable wearable electronic device.
Figure 9:
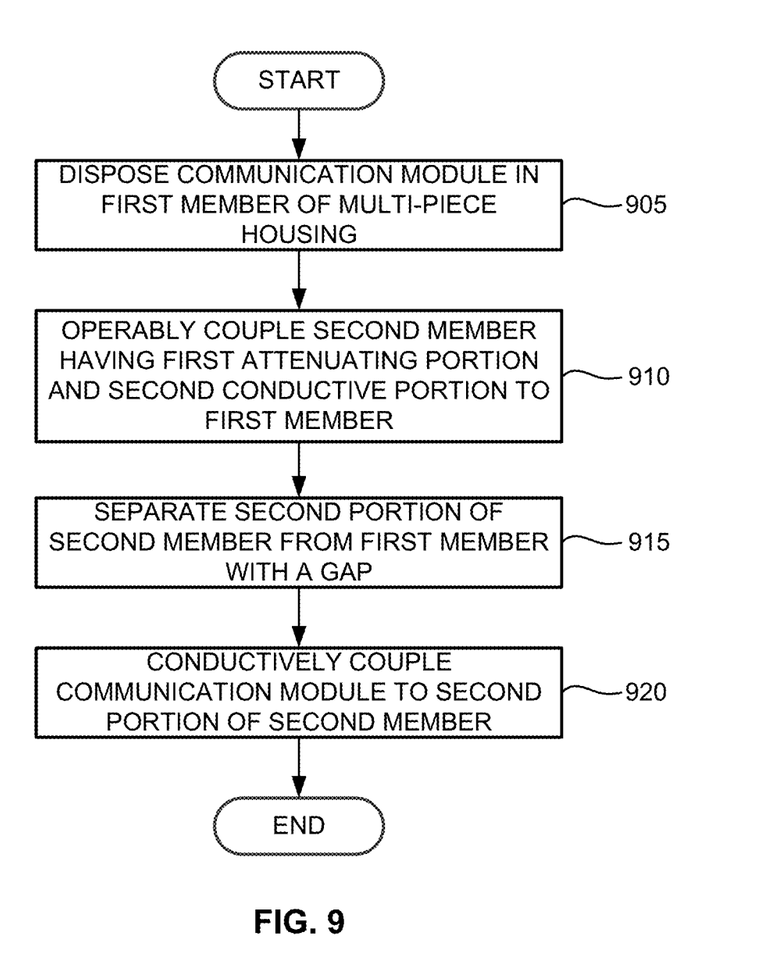
FIGS. 9 and 10 are flow diagrams representing example processes that may be implemented as machine-readable instructions that may be executed to assemble a base customizable wearable electronic device for customization.
Figure 10:
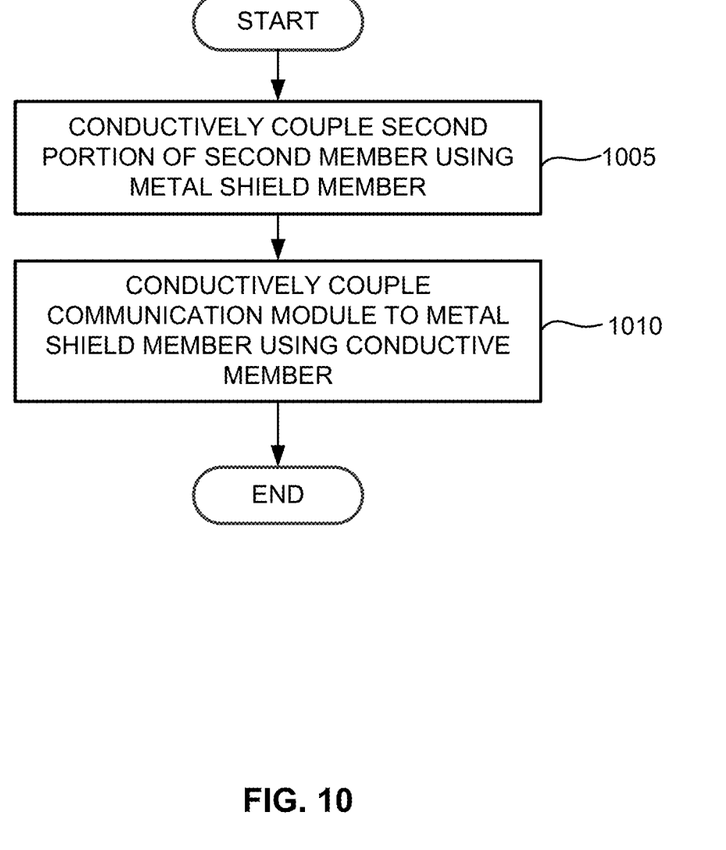

FIGS. 8, 9 and 10 are flow diagrams representative of example process(es) that may be implemented as coded computer-readable instructions. The coded instructions may be executed to, for example, control one or more machines or devices to assemble customizable wearable electronic devices in accordance with this disclosure. In this example, the coded instructions comprise one or more programs for execution by a processor such as the processor 1105 shown in the example processor platform 1100 discussed below in connection with FIG. 11. The program(s) may be embodied in the coded instructions and stored on one or more tangible computer-readable storage mediums associated with the processor 1105. One or more of the program(s) and/or parts thereof could alternatively be executed by a device other than the processor 1105. One or more of the programs may be embodied in firmware or dedicated hardware. Further, although the example process(es) is/are described with reference to the flowcharts illustrated in FIGS. 8-10, many other methods of assembling customizable electronic devices in accordance with this disclosure may alternatively be used. For example, the order of execution of the blocks may be changed, and/or some of the blocks described may be changed, eliminated, or combined.

As mentioned above, the example process(es) of FIGS. 8-10 may be implemented using coded instructions (e.g., computer-readable instructions and/or machine-readable instructions) stored on one or more tangible computer-readable storage mediums. As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally, or alternatively, the example process(es) of FIGS. 8-10 may be implemented using coded instructions (e.g., computer-readable instructions and/or machine-readable instructions) stored on one or more non-transitory computer mediums. As used herein, the term non-transitory computer-readable storage medium is expressly defined to include any type of computer-readable storage device and/or storage disk and to exclude propagating signals and to exclude transmission media. As used herein, "non-transitory computer-readable storage medium" and "non-transitory machine-readable storage medium" are used interchangeably.

Example tangible computer-readable storage mediums include, but are not limited to, any tangible computer-readable storage device or tangible computer-readable storage disk such as a memory associated with a processor, a memory device, a flash drive, a digital versatile disk (DVD), a compact disc (CD), a Blu-ray disk, a floppy disk, a hard disk drive, a random access memory (RAM), a read-only memory (ROM), etc. and/or any other storage device or storage disk in which information is stored for any duration (e.g., for extended time periods, permanently, for brief instances, for temporarily buffering, and/or for caching of the information).

The example process of FIG. 8 includes controlling one or more machines, devices, etc. to customize a base customizable wearable electronic device that is not yet customized (block 805). The base customizable wearable electronic device may be assembled according to, for example, the example processes of FIG. 9 and/or FIG. 10. One or more machines, devices, etc. are controlled to select customization parts 151, 502, 602 based on for example, a manufacturing schedule, customer request, etc. (block 810). One or more machines, devices, etc. are controlled to assemble the selected customization parts 151, 502, 602 to the base customizable wearable electronic device using elastic electrically-conductive couplers 152 to form a customized wearable electronic device (block 815). Control then exits from the example process of FIG. 8.

The example processes of FIG. 9 include controlling one or more machines, devices, etc. to form a base wearable electronic device. The example processes of FIG. 9 include disposing one or more one or more communication modules 140 at least partially in a housing bottom member 110 of a multi-piece housing 101 (block 905). A housing top member 120 that includes an RF attenuating portion 122 and a RF conducting portion 124 is operably coupled to the bottom member 110 (block 910). A electrical-isolation gap member 130 is placed or otherwise formed between the bottom member 110 and the RF conducting portion 124 of the top member 120 (block 915). One or more electrically-conductive contacts 144 are placed to electrically couple the one or more communication modules 140 to some or all of the RF conducting portion 124 of the top member 120 (block 920). Control then exits from the example processes of FIG. 9.

The example processes of FIG. 10 include controlling one or more machines, devices, etc. to, for example, at block 920 of the example process of FIG. 9, assemble a electrically-conductive shield 302 to electrically couple the one or more communication modules 140 to the RF conducting portion 124 of the top member 120. The example processes of FIG. 10 include coupling an electrically-conductive shield 302 to some or all of the RF conducting portion 124 of the top member 120 (block 1105), and electrically coupling the one or more communication modules 140 to the electrically-conductive shield 302 (block 1110). Control then exits from the example processes of FIG. 10 to, for example, block 920 of FIG. 9.

Figure 11:
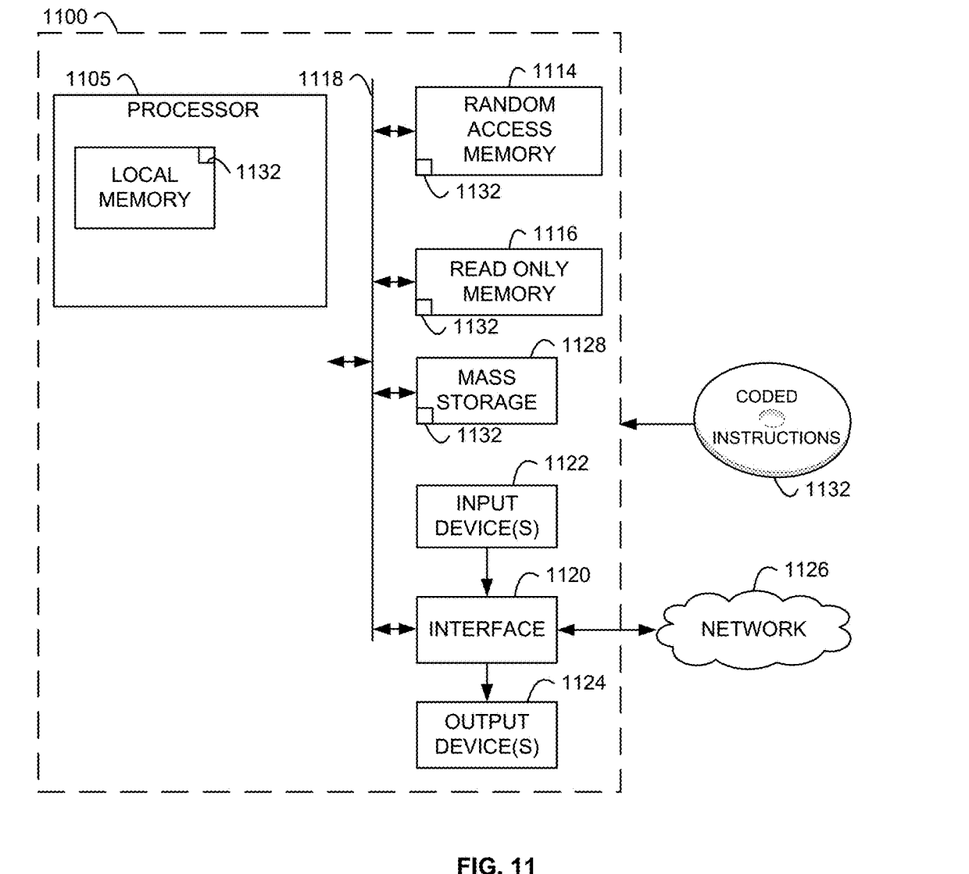
FIG. 11 illustrates an example processor system structured to execute the example instructions of FIGS. 8-10 to assemble customizable wearable electronic devices.

FIG. 11 is a block diagram of an example processor platform 1100 configured to execute the process(es) of FIGS. 8-10 to assemble customizable wearable electronic devices. The processor platform 1100 can be, for example, a server, a personal computer, manufacturing controller, manufacturing machine controller, or any other type of computing device. The processor platform 1100 may be used to implement the example PCB 142 of FIGS. 1, 3 and 4.

The processor platform 1100 of the illustrated example includes a processor 1105. The processor 1105 of the illustrated example is hardware. For example, the processor 1105 can be implemented by one or more integrated circuits, logic circuits, microprocessors, GPUs, or controllers from any desired family or manufacturer.

The processor 1105 of the illustrated example includes a local memory 1113 (e.g., a cache). The processor 1105 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory (RAM) device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface.

In the illustrated example, one or more input devices 1122 are connected to the interface circuit 1120. The input device(s) 1122 permit(s) a user to enter data and commands into the processor 1105. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor. In some examples the DTM 126 includes one or more input devices 1122 and/or one or more output devices 1124 to implement a touch screen interface.

The interface circuit 1120 of the illustrated example also includes one or more communication devices such as the example communication modules 140, which may include transmitters, receivers, transceivers, modems and/or network interfaces to facilitate exchange of data with external machines (e.g., computing devices of any kind) via a network 1126 (e.g., an Ethernet connection, a digital subscriber line (DSL), a telephone line, coaxial cable, a cellular telephone system, NFC signals, satellite receivers, etc.).

The interface circuit 1120 of the illustrated example may also be used to provide commands, instructions, etc. to one more machines, devices, etc. to control the assembly of customizable wearable electronic devices, and/or to receive data, information, etc. regarding the assembly of customizable wearable electronic device from the same.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 include the machine-readable instructions of FIGS. 8-10 and may be stored in the mass storage device 1128, in the volatile memory 1114, in the non-volatile memory 1116, and/or on a removable tangible computer readable storage medium such as a CD or DVD.

An example customizable wearable electronic device includes a housing bottom member, a housing top member including a radio frequency (RF) attenuating portion that includes a material that attenuates RF energy and an RF conducting portion that includes an electrically-conductive material, the housing top member separated from the housing bottom member by an electrical isolation gap member, an electrically-conductive contact to couple the RF conducting portion of the top housing member to a communication module in the customizable wearable electronic device, and a customization part selected from a plurality of different customization parts having respective different configurations, the selected customization part electrically coupled to the RF conducting portion of the housing top member when the selected customization part is assembled to the housing top member.

An example method of assembling a customizable wearable electronic device includes electrically coupling a communication module to a radio frequency (RF) conducting portion of a first housing member, assembling the RF conducting portion to a second housing member with an intervening electrical isolation gap, the assembling of the first and second housing members disposing the communication module between the first and second housing members, and assembling a customization part selected from a plurality of customization parts to the first housing portion to provide a selected aesthetic appearance, the selected customization part electrically coupled to the communication module via the RF conducting portion.

An example tangible computer-readable storage medium stores instructions that, when executed, cause a machine to at least select a customization part for assembly to a customizable base wearable electronic device, and assemble the selected customization part to the customizable base wearable electronic device to electrically couple an antenna of the customizable base wearable electronic device to an electrically-conductive portion of the customization part.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, as used herein, when the phrase "at least" is used in this specification and/or as the appended claim, it is open-ended in the same manner as the term "comprising" is open ended.

Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the examples disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A customizable wearable electronic device comprising:
a housing bottom member;
a housing top member including a radio frequency (RF) attenuating portion that includes a material that attenuates RF energy and an RF conducting portion that includes an electrically-conductive material, the housing top member separated from the housing bottom member by an electrical isolation gap member;
an electrically-conductive contact to couple the RF conducting portion of the top housing member to a communication module in the customizable wearable electronic device; and
a customization part selected from a plurality of different customization parts having respective different configurations, the selected customization part electrically coupled to the RF conducting portion of the housing top member when the selected customization part is assembled to the housing top member, the selected customization part is at least partially externally exposed when the selected customization part is assembled to the housing top member.

2. The customizable wearable electronic device of claim 1, wherein the selected customization part implements part of an antenna.

3. The customizable wearable electronic device of claim 1, further including the communication module disposed between the housing top member and the housing bottom member.

4. The customizable wearable electronic device of claim 3, wherein the communication module includes at least one of a global navigation satellite system receiver, a Bluetooth® transceiver, a cellular communication transceiver, a near-field communication transceiver, and a Wi-Fi transceiver.

5. The customizable wearable electronic device of claim 1, wherein the customizable wearable electronic device includes a watch, and the selected customization part includes a watch bezel.

6. The customizable wearable electronic device of claim 1, wherein at least two of the plurality of different customization parts are formed of different conductive materials.

7. The customizable wearable electronic device of claim 1, wherein the material that attenuates the RF energy includes a layer of electrically-conductive material.

8. The customizable wearable electronic device of claim 1, further including a display touch module disposed at least partially within the housing top member.

9. The customizable wearable electronic device of claim 1, wherein the RF conducting portion of the top housing member and the selected customization part form an antenna tuned for use with at least one of a global navigation satellite system transceiver, a Bluetooth® transceiver, a cellular communication transceiver, and a Wi-Fi transceiver.

10. A customizable wearable electronic device comprising:
a housing bottom member;
a housing top member including a radio frequency (RF) attenuating portion that includes a material that attenuates RF energy and an RF conducting portion that includes an electrically-conductive material, the housing top member separated from the housing bottom member by an electrical isolation gap member;
an electrically-conductive contact to couple the RF conducting portion of the housing top member to a communication module in the customizable wearable electronic device;
a customization part selected from a plurality of different customization parts having respective different configurations, the selected customization part electrically coupled to the RF conducting portion of the housing top member when the selected customization part is assembled to the housing top member; and
an electrically-conductive coupler between the selected customization part and the RF conducting portion of the housing top member when the selected customization part is assembled to the housing.

11. The customizable wearable electronic device of claim 10, wherein the electrically-conductive coupler includes an elastic member.

12. A method of assembling a customizable wearable electronic device, the method comprising:
electrically coupling a communication module to a radio frequency (RF) conducting portion of a first housing member;
assembling the RF conducting portion to a second housing member with an intervening electrical isolation gap, the assembling of the first and second housing members disposing the communication module between the first and second housing members; and
assembling a customization part selected from a plurality of customization parts to the first housing member to provide a selected aesthetic appearance, the selected customization part electrically coupled to the communication module via the RF conducting portion.

13. The method claim 12, further comprising placing an electrically-conductive coupler between the customization part and the RF conducting portion when the customization part is assembled to the first housing member.

14. The method of claim 12, wherein the customizable wearable electronic device includes a watch.

15. The method of claim 12, further including assembling to the customization part a second customization part selected from a second plurality of customization parts having respective second aesthetic appearances.

16. The method of claim 15, wherein the customizable wearable electronic device includes a watch, and the second customization part is a watch bezel.

17. The method of claim 12, wherein the customizable wearable electronic device includes a watch, and wherein at least some of the plurality of customization parts are formed of different electrically-conductive materials and different electrically non-conductive materials.

18. The method of claim 12, further including disposing a display touch module at least partially within the first housing member.

19. The method of claim 12, further including forming the intervening electrical isolation gap using an electrically isolating material.

20. A non-transitory computer-readable storage medium comprising instructions that, when executed, cause a machine to at least: select a customization part for assembly to a customizable base wearable electronic device; and assemble the selected customization part to the customizable base wearable electronic device to electrically couple an antenna of the customizable base wearable electronic device to an electrically-conductive portion of the customization part, wherein the selected customization part is externally exposed after assembly to the customizable base wearable electronic device.

21. A non-transitory computer-readable storage medium comprising instructions that, when executed, cause a machine to at least: select a customization part for assembly to a customizable base wearable electronic device; assemble the selected customization part to the customizable base wearable electronic device to electrically couple an antenna of the customizable base wearable electronic device to an electrically-conductive portion of the customization part; and position a resilient electrically-conductive member between the selected customization part and the customizable base wearable electronic device.

* * * * *